(12) United States Patent
Yanase et al.

(10) Patent No.: US 8,298,711 B2
(45) Date of Patent: Oct. 30, 2012

(54) METHOD OF OPERATING FUEL CELL SYSTEM AND FUEL CELL SYSTEM

(75) Inventors: Norimasa Yanase, Chiba (JP); Fumiharu Iwasaki, Chiba (JP); Kazutaka Yuzurihara, Chiba (JP); Tsuneaki Tamachi, Chiba (JP); Takafumi Sarata, Chiba (JP); Toru Ozaki, Chiba (JP)

(73) Assignee: Seiko Instruments Inc. (JP)

( * ) Notice: Subject to any disclaimer, the term of this patent is extended or adjusted under 35 U.S.C. 154(b) by 788 days.

(21) Appl. No.: 11/662,906

(22) PCT Filed: Jan. 12, 2006

(86) PCT No.: PCT/JP2006/000301
§ 371 (c)(1),
(2), (4) Date: Apr. 27, 2007

(87) PCT Pub. No.: WO2006/077768
PCT Pub. Date: Jul. 27, 2006

(65) Prior Publication Data
US 2007/0264541 A1    Nov. 15, 2007

(30) Foreign Application Priority Data

Jan. 18, 2005 (JP) .................................. 2005-010537
Dec. 28, 2005 (JP) .................................. 2005-378109

(51) Int. Cl.
*H01M 8/00* (2006.01)
*H01M 8/04* (2006.01)
*H01M 8/24* (2006.01)

(52) U.S. Cl. ......... 429/428; 429/400; 429/429; 429/430; 429/455

(58) Field of Classification Search ..................... None
See application file for complete search history.

(56) References Cited

U.S. PATENT DOCUMENTS

| 2001/0008718 | A1  | 7/2001  | Kobayashi ..................... 429/9 |
| 2004/0214055 | A1* | 10/2004 | Aoyama et al. ................ 429/19 |
| 2005/0040786 | A1* | 2/2005  | Ichinose et al. .............. 320/101 |

FOREIGN PATENT DOCUMENTS

JP        2004253220        9/2004

* cited by examiner

*Primary Examiner* — Emily Le
*Assistant Examiner* — Sarah A Slifka
(74) *Attorney, Agent, or Firm* — Adams & Wilks

(57) ABSTRACT

In a fuel cell power source system comprising a fuel cell, a fuel supplier for supplying a fuel to the fuel cell, an electricity storing member capable of charging and discharging an energy, and a control circuit for controlling outputs of the fuel cell and the electricity storing member and the fuel supplier for supplying a power to an external load, there are provided a method of operating the fuel cell power source system and a fuel cell system promoting safety of the fuel cell system and reducing a deterioration in the fuel cell by removing the fuel remaining at inside of the fuel cell after stopping the fuel supplier. At an initial stage of supplying the power to the external load and inside of the fuel cell system, the power is supplied from the electricity storing member, and the electricity storing member is charged by using an output outputted from the fuel cell by generating the power by the fuel cell by using the fuel remaining at inside of the fuel cell system after stopping the external load.

9 Claims, 7 Drawing Sheets

METHOD OF OPERATING FUEL CELL SYSTEM AND FUEL CELL SYSTEM

CROSS-REFERENCE TO RELATED APPLICATIONS

This application is a U.S. national stage application of International Application No. PCT/JP2006/300301, filed Jan. 12, 2006, claiming an earliest priority date of Jan. 18, 2005, and published in a non-English language.

BACKGROUND OF THE INVENTION

1. Technical Field

The present invention relates to a fuel cell system using a fuel cell as a power source and its operating method.

2. Background Art

In recent years, power consumption of a portable apparatus represented by a portable telephone has been increased more and more in accordance with high function formation of the apparatus, and an increase in a capacity of a power source poses a serious problem. Recently, attention is attracted to a fuel cell as a small-sized energy source having a high energy density. According to the fuel cell, an electrolyte is interposed by two kinds of electric poles. Electricity is generated by oxidizing a fuel of hydrogen, methanol or the like by a fuel pole and deoxidizing oxygen in the atmosphere by an oxygen pole. Among fuel cells, a solid polymer type fuel cell can generate power at a vicinity of room temperature, provided with a high output density and can be downsized and therefore, application thereof as a power source for a portable apparatus is expected.

However, after stopping power generation by the solid polymer type fuel cell, when a fuel remaining at an inside of the fuel cell is left without being removed from the fuel cell, various problems are posed.

For example, when methanol is used as a fuel, there pose problems of a deterioration of an electrolyte film by swelling the electrolyte film, consumption of the fuel by crossover of the methanol fuel and the like, and when hydrogen is used as a fuel, there pose problems of leakage of hydrogen, a danger of explosion in accordance with leakage of hydrogen and the like.

With regard to the problems, there is known a method of removing the fuel at inside of the fuel cell by generating power by the fuel cell by the fuel remaining at the inside of the fuel cell and consuming power by a load of a heater, a resistor or the like.

However, according to the method, there pose problems that a rate of efficiently utilizing the fuel is reduced and the energy density of the fuel cell system is reduced.

SUMMARY OF THE INVENTION

The invention is a method of operating a fuel cell system including a fuel cell connected to a fuel supplier, an electricity storing member, and a control unit connected to the fuel cell and the electricity storing member, the method comprising a step of starting to supply a power from the electricity storing member to the control unit and an external load connected to the control unit in starting the fuel cell system, a step of detecting a power discharge amount of the electricity storing member, a step of starting to supply a fuel from the fuel supplier to the fuel cell when the power discharge amount of the electricity storing member reaches a predetermined power discharging amount, and a step of starting to supply the power from the fuel cell to the control unit and interrupting to supply the power from the electricity storing member to the control unit.

Thereby, for example, in starting the fuel cell system using DMFC connected in series with a plurality of cells as a fuel cell, when the fuel cell system supplies the power to the external load or inside of the fuel cell system, before supplying methanol constituting the fuel to the fuel cell, the power is supplied from the electricity storing member to the external load, an amount of electricity outputted from the electricity storing member is detected, when the detected value is equal to or larger than a predetermined power discharging capacity, supply is started and power generation of the fuel cell is started.

Here, when as a value of the predetermined power discharge amount, an amount of electricity provided from the fuel cell by consuming the fuel remaining at the inside of the fuel cell system from the fuel cell after stopping to supply the fuel from the fuel supplier to the fuel cell is designated by notation $C1$, a vacant capacity equal to or larger than at least $C1$ is ensured in the electricity storing member by starting to supply the fuel to the fuel cell when the amount of electricity outputted from the electricity storing member reaches $C1$ or more in starting the system.

Further, when the power is made to be able to be supplied from the fuel cell to the control unit, supply of the power to the external load is switched from the electricity storing member to an output of the fuel cell by the control unit.

In the method of operating the fuel cell system, the method further comprises after the step of starting to supply the fuel to the fuel cell, a step of supplying the power from the fuel cell to the external load by way of the control unit, a step of detecting the power discharge amount of the electricity storing member by restarting to supply the power from the electricity storing member to the external load by way of the control unit when a request for the power from the load is equal to or larger than a maximum output of the fuel cell, and a step of supplying the power from the fuel cell to the external load by way of the control unit and charging an electricity amount of an amount of a difference between a predetermined value and the power discharge amount to the electricity storing member when the request for the power from the load is less than the maximum power of the fuel cell and the power discharge amount of the electricity storing member is equal to or larger than the predetermined value.

Thereby, when the request for the power from the load is equal to or larger than the maximum output of the fuel cell, the output of the fuel cell and the output from the electricity storing member are simultaneously supplied to the external load. Further, when the request for the power from the load is less than the maximum output of the fuel cell and the power discharge amount of the electricity storing member is equal to or larger than the predetermined value, the electricity amount of the amount of the difference between the predetermined value and the power discharge amount is discharged and therefore, when the fuel is supplied to the fuel cell, the power is charged to the electricity storing member by leaving the vacancy capacity of, for example, $C1$ and therefore, in a state of transporting the fuel from the fuel supplier to the fuel cell, the electricity storing member is not fully charged, and when supply of the fuel from the fuel supplier to the fuel cell is cut, the electricity storing member is ensured with an chargeable vacancy capacity.

In the method of operating the fuel cell system, the method further comprises a step of stopping to supply the fuel to the fuel cell when the external load is stopped, a step of continuing to generate the power by the fuel remaining at inside of the fuel cell, and a step of supplying the power generated by the remaining fuel to the electricity storing member by way of the control unit.

Thereby, by continuing to generate the power by the fuel cell and charging the electricity storing member in the state of not supplying the fuel to the fuel cell, the fuel remaining at inside of the fuel cell system is consumed, the fuel at inside of the fuel cell is reduced and at the same time, the electricity storing member is brought into substantially a fully charged state.

In the method of operating the fuel cell system, the method further comprises when the external load is stopped and the power discharge amount of the electricity storing member is equal to or larger than the predetermined value, a step of generating the electricity amount of the amount of the difference between the predetermined value and the power discharge amount by the fuel cell and supplying the power to the electricity storing member by way of the control unit, a step of stopping to supply the fuel to the fuel cell, a step of continuing to generate the power by the fuel remaining at inside of the fuel cell, and a step of supplying the power generated by the remaining fuel to the electricity storing member by way of the control unit.

Thereby, after stopping the external load, for example, when the power discharge amount of the electricity storing member is equal to or larger than C1, until the vacancy capacity of charging the electricity storing member reaches C1, the fuel is supplied to the fuel cell and the electricity storing member is charged. Although when the vacancy capacity of the electricity storing member reaches C1, supply of the fuel to the fuel cell is stopped, even thereafter, by using the fuel remaining at inside of the fuel cell system in the state of not supplying the fuel to the fuel cell and charging the electricity storing member by continuing to generate the power by the fuel cell, the fuel remaining at inside of the fuel cell system is consumed, the fuel at inside of the fuel cell is reduced and at the same time, the electricity storing member is brought into substantially the fully charged state.

In the method of operating the fuel cell system, the method is characterized in that in the step of continuing to generate the power by the fuel cell with the fuel remaining at inside of the fuel cell after stopping to supply the fuel from the fuel supplier to the fuel cell after stopping the external load, in continuing to generate the power, the power is generated only by a single cell constituting the fuel cell. Thereby, when supply of the fuel to the fuel cell is stopped and an amount of the fuel remaining at inside of the fuel cell system is small, although when a plurality of cells are connected in series or connected in parallel, there is brought about a cell subjected to polarity reversion by a variation of internal impedances of the cells or the like, by providing the output only from the single cell constituting the fuel cell, power generation can be continued without subjecting all of the cells constituting the fuel cell to polarity reversion.

There is provided a fuel cell system comprising a fuel cell, a fuel supplier including a fuel vessel for holding a fuel or a reaction assisting catalyst and a valve connected to the fuel vessel for supplying the fuel to the fuel cell, at least one of electricity storing members capable of storing and discharging electricity, and a control unit including a DC-DC converter connected to the fuel cell for controlling an output of the fuel cell, a power detecting circuit connected to the electricity storing member for detecting an amount of charging and discharging the electricity storing member, and a control circuit connected to the DC-DC converter and the power detecting circuit for forming an electric path of the DC-DC converter, the power detecting circuit and an external load and opening and closing the valve.

Further, the fuel transported from the fuel supplier to the fuel cell is not limited to methanol but is at least one kind or more of a group constituting alcohols in a gaseous state, hydrogen and the like other than alcohols, an aqueous solution of sodium borohydride, an aqueous solution including stabilized sodium borohydride or the like, chemical halides or the like.

Further, as the electricity storing member, at least one of a group constituting a secondary cell, a capacitor, a condenser and the like can arbitrarily be selected. As the secondary battery, there can be selected arbitrarily at least one of a group constituting a lithium ion secondary cell, a lithium polymer secondary cell, a metal lithium secondary cell, a nickel hydrogen secondary cell, a nickel cadmium secondary cell, a nickel iron secondary cell, a nickel zinc secondary cell, a silver oxide zinc secondary cell, a zinc halogen secondary cell, a lead storage battery, a redox flow cell, a sodium sulfur cell and the like.

The control circuit is characterized in switching to open and close the valve based on a value of detecting an amount of charging and discharging the electricity storing member detected by the power detecting circuit.

Thereby, supply of the fuel is controlled such that the electricity storing means is not overcharged.

The control circuit is characterized in charging the electricity storing member by ensuring a vacancy capacity equal to or larger than a predetermined value at the electricity storing member when the fuel is supplied from the fuel supplier to the fuel cell.

Thereby, even when the electricity storing means is continued to be charged after cutting to supply the fuel from the fuel holding means to the fuel cell, the electricity storing means is avoided from being overcharged.

The fuel supplier is characterized in comprising a fuel vessel for holding the fuel or a reaction assisting catalyst, and a pump connected to the fuel vessel for supplying and cutting the fuel to the fuel cell.

Thereby, an amount of supplying the fuel from the fuel holding means to the fuel cell can be increased.

The fuel supplier is characterized in comprising a fuel vessel for holding a fuel source, a reformer connected to the fuel cell for forming the fuel of the fuel cell from the fuel source, and a valve connected to the fuel vessel and the reformer for supplying and cutting the fuel source from the fuel vessel to the reformer.

Thereby, similar operation can be carried out in a fuel cell system of a type of constituting a fuel of a fuel cell by reforming a chemical substance including hydrogen of alcohol of methanol or the like, an inorganic chemical halide of sodium borohydride or the like, an organic chemical halide of cyclohexane or the like as a fuel source.

The fuel supplier is characterized in comprising a fuel vessel for holding a fuel source, a reformer connected to the fuel cell for forming the fuel of the fuel cell based on the fuel source, and a pump connected to the fuel vessel and the reformer for supplying and cutting the fuel source from the fuel vessel to the reformer. Thereby, an amount of supplying the fuel source can be increased.

According to the invention, in a state in which the fuel remains at inside of the fuel cell system, the electricity storing member is not brought into a fully charged state and therefore, the fuel remaining at inside of the fuel cell can firmly be removed after stopping the external load. Therefore, the danger of explosion by leakage of the fuel or an adverse influence on the human body can be avoided and safety of the fuel cell system is promoted. Further, by removing the fuel from inside of the fuel cell, a deterioration of a film or a catalyst can be avoided, which amounts to prolong service life of the fuel cell system.

Further, the fuel source or the fuel can be utilized with high efficiency and the energy density of the fuel cell system is promoted since the fuel remaining at inside of the fuel cell is used for power generation of the fuel cell and the power provided from the fuel cell is used for charging the electricity storing member after stopping the external load.

DETAILED DESCRIPTION OF THE INVENTION

Embodiments of the invention will be explained in reference to the drawings as follows.

Embodiment 1

Embodiment 1 of a fuel cell system according to the invention will be explained as follows in reference to FIG. 1. In the embodiment, particularly, a constitution of a fuel cell system will be explained.

Figure 1:
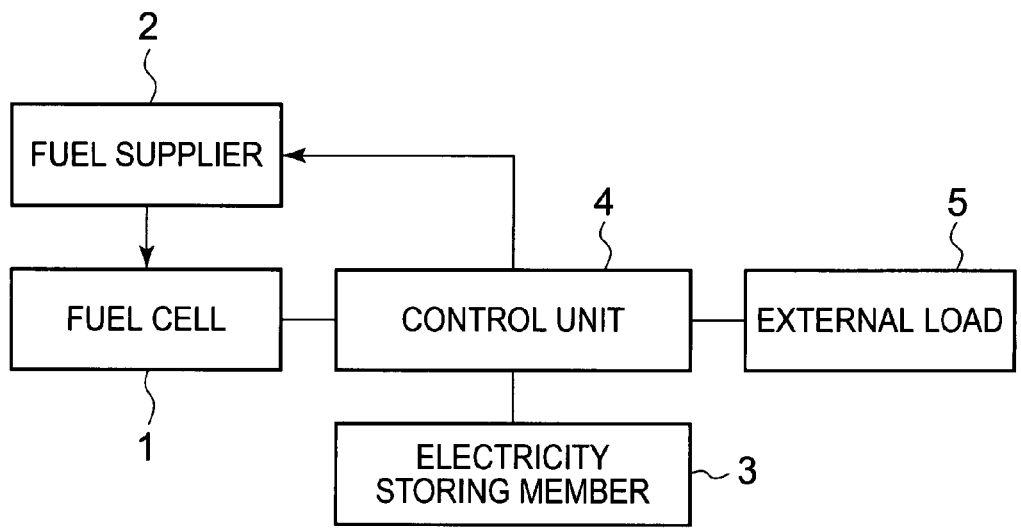
FIG. 1 is an outline diagram showing an example of a constitution of a fuel cell system according to Embodiment 1 and Embodiment 7 of the invention.

As shown by FIG. 1, the fuel cell system is constructed by a constitution of comprising a fuel cell 1 using hydrogen as a fuel, a fuel supplier 2 for forming a fuel from a fuel source and supplying the fuel, a single cell of a lithium ion secondary cell 3 (hereinafter, described as LIB 3) as an electricity storing member 3, and a control unit 4 for controlling to form an electric path of the fuel cell 1 and the LIB 3 and an external load 5 and supplying the fuel and supplying power to the external load 5.

Hydrogen constituting the fuel of the fuel cell is formed by bringing a hydrogen generating catalyst with regard to an aqueous solution of sodium borohydride into contact with sodium borohydride. Malic acid is used for the hydrogen generating catalyst.

Figure 2:
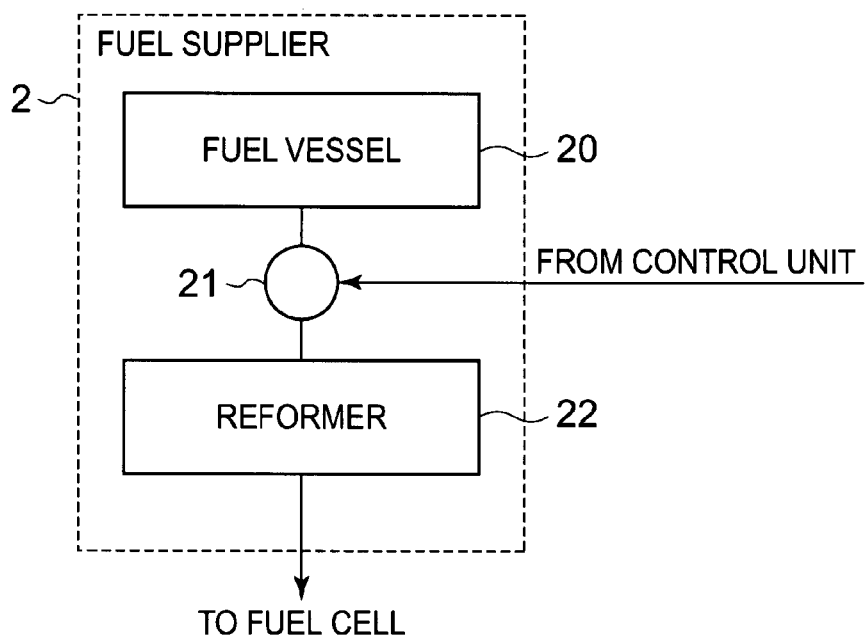
FIG. 2 is an outline diagram showing a constitution of a fuel supplier 2 according to Embodiment 1 and Embodiment 7 of the invention.

As shown by FIG. 2, the fuel supplier 2 is constituted by a reformer 22 arranged with sodium borohydride in a solid state constituting the fuel source, a fuel vessel 20 made to hold malic acid, and a valve 21 for switching supply of malic acid from the fuel vessel 20.

Figure 4:
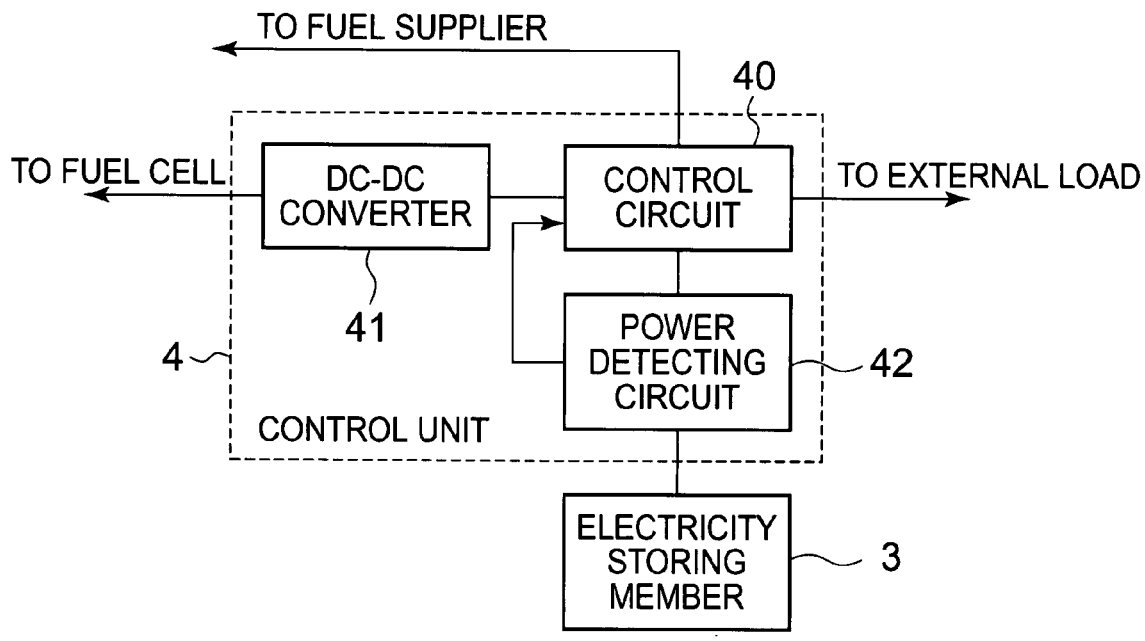
FIG. 4 is an outline diagram showing an example of a constitution of a control unit according to Embodiment 1 and Embodiment 7 of the invention.

As shown by FIG. 4, the control unit 4 is constituted by a DC-DC converter 41 for stepping up a voltage of an output of the fuel cell 1 to 4.2 V constituting a voltage of charging the LIB 3, a power detecting circuit 42 for detecting an amount of charging and discharging the LIB 3, and a control circuit 40 for forming the electric path of the DC-DC converter 41 and the power detecting circuit 42 and the external load and controlling to open and close the valve 21.

Figure 5:
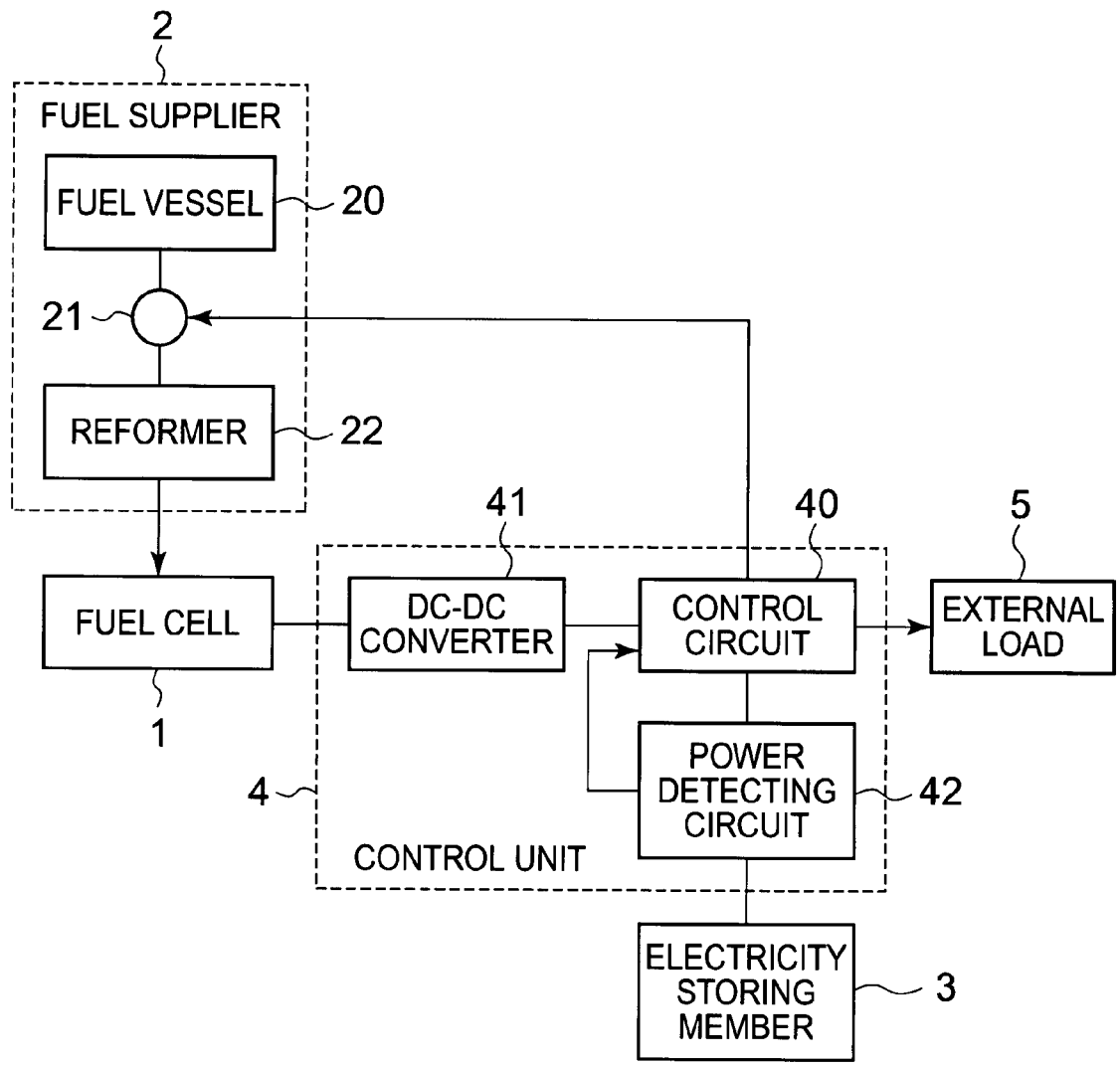
FIG. 5 is an outline diagram showing an example of a constitution of a fuel cell system according to Embodiment 1 and Embodiment 7 of the invention.

The control circuit 40 is inputted with a value of detecting the amount of charging and discharging the LIB 3 by the power detecting circuit 42 and controls to switch the electric path of the DC-DC converter 41 and the power detecting circuit 42 and the external load 5 and open and close the valve 21 based on the detected value. An electronic load apparatus is used for the external load 5. FIG. 5 shows an example of a constitution of the fuel cell system according to Embodiment 1.

The fuel cell 1 is connected in series with two single cells of fuel cells. An open circuit voltage of the fuel cell 1 was 1.89 V, and a maximum output thereof was 3.24 W (0.9 V·3.6 A). Further, a power amount C1 provided from the DC-DC converter 41 by generating power by the fuel cell 1 by hydrogen remaining at inside of the fuel cell system after cutting supply of the fuel from the fuel supplier 2 to the fuel cell 1 has been 0.9 W·min.

Rating of the LIB 3 is constituted by a rated capacity of 700 mAh, and a charge voltage of 4.2 V. A current charged to the LIB 3 is restricted by a maximum of 350 mA by the control circuit.

A switching regulator of a step up voltage type is used for the DC-DC converter 41. A measured value of an output voltage value of the DC-DC converter 41 has been 4.21 V. A maximum output of the DC-DC converter 41 has been 2.65 W, and a conversion efficiency at this occasion has been 82%.

The power detecting circuit 42 is constituted by a current detecting resistor for detecting a current of charging and discharging the LIB 3 and an amplifier for amplifying a potential difference produced between both ends of the current detecting resistor, and a signal output terminal for outputting an output of the amplifier to the control circuit 40, although not illustrated. An output signal from the signal terminal is inputted to a signal input terminal of the control circuit 40.

The control circuit 40 is constituted by an operating circuit for adding or subtracting the output of the amplifier of the power detecting circuit 42 inputted to the signal input terminal, and a comparing operating circuit for comparing a result of operation of the operating circuit with a previously set threshold and generating a signal for controlling to switch the electric path of the DC-DC converter 41 and the power detecting circuit 42 and the external load 5 and open and close the valve 21, although illustrated, and the previously set threshold is set based on 0.9 W·min constituting the power amount C1. As steps of operating the fuel cell sytsem, a program is written using a PC, downloaded to a microcomputer and mounted to the control circuit 40.

Embodiment 2

Figure 6:
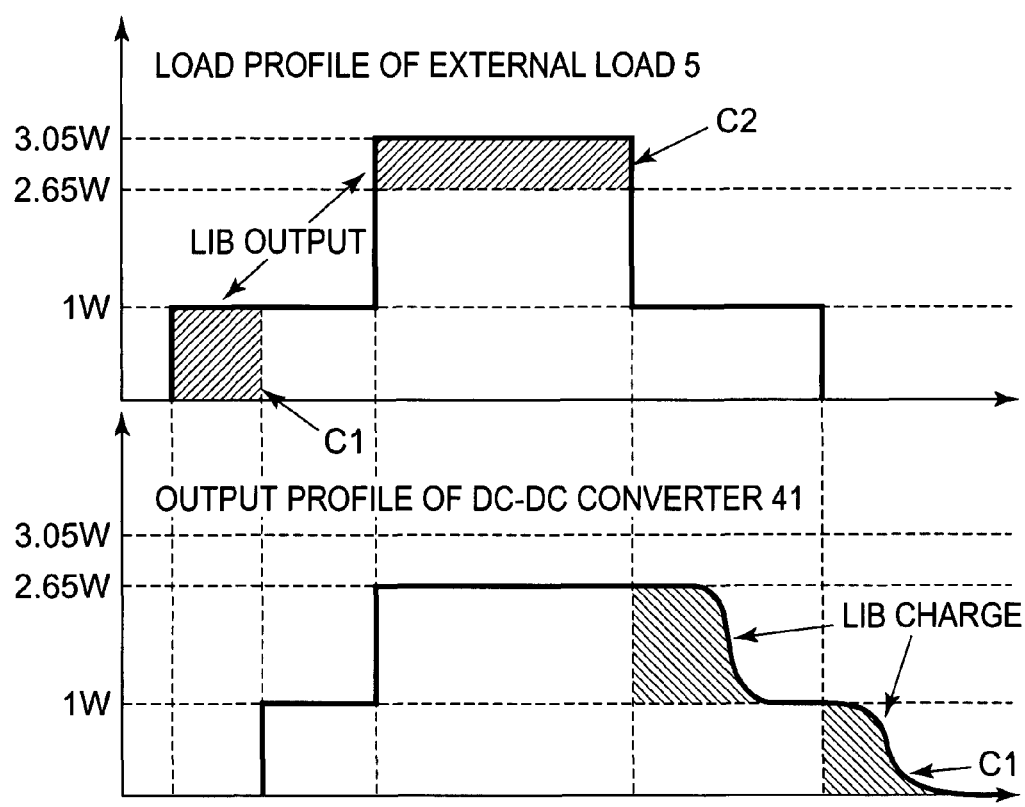
FIG. 6 is a graph showing an example of a load profile of an external load 5 and an output profile of a DC-DC converter 41 at this occasion according to Embodiment 2 of the invention.

Embodiment 2 of a fuel cell system according to the invention will be explained as follows in reference to FIG. 6.

Power was supplied actually to the external load by using the fuel cell system constituted in Embodiment 1. FIG. 6 shows a load profile of the external load 5 and an output profile of the DC-DC converter 41 at this occasion.

In starting the fuel sell system, at the control circuit 40, the external load 5 and the power detecting circuit 42 are connected. When the external load 5 is applied, power is supplied to the external load 5 swiftly from the LIB 3. Here, an applied load is set to 1 W. When the power detecting circuit 42 detects an amount of power outputted from the LIB 3, and it is determined that the LIB 3 executes an output 0.9 W·min or more (C1) to the external load based on a signal detected by the power detecting circuit 40, the detecting means 40 brings the valve 21 into an open state and the fuel is supplied to the fuel cell 1. At this occasion, the control circuit 40 opens the valve 21 about 0.9 minute after applying the load.

In a state of supplying the fuel to the fuel cell 1, when a load of the external load 5 in a steady state is equal to or smaller than a maximum output of the DC-DC converter, power is not supplied from the LIB 3 to the external load. Hence, a value of setting the load of the external load 5 of 3.05 W equal to or larger than the maximum output of the DC-DC converter is applied for 2 minutes. At this occasion, 2.65 W of the maximum output is outputted from the DC-DC converter and a deficient amount of 0.4 W is outputted from the LIB 3. The amount of power outputted from the LIB 3 is detected by the power detecting circuit 42 and the detected value is operated and stored by the control circuit 40.

Thereafter, when the load of the external load 5 is reduced to 1 W, the load of 1 W is equal to or smaller than 2.65 W of the maximum output of the DC-DC converter and an output of charging LIB 3 can be outputted from the DC-DC converter. At this occasion, the control circuit 40 charges LIB 3 by a power amount (C2 of FIG. 6) outputted from LIB 3 when the external load is 3.05 W by using a power amount constituted by subtracting the output amount to the external load 5 from the maximum output of the DC-DC converter 41 when the external load 5 is 1 W. When the control circuit 40 determines that the power amount of C2 is charged to LIB 3, the control circuit 40 stops charging LIB 3 to bring about a state of ensuring vacancy of a charge amount of C1 at LIB 3. Thereafter, when the external load 5 is stopped, and there is not a load in the fuel cell system, the control circuit 40 brings the valve 21 into a closed state and stops supplying the fuel to the fuel cell 1. Hydrogen of an amount of outputting a power amount of C1 remains at inside of the fuel cell system. After stopping to supply the fuel to the fuel cell 1, hydrogen remains at inside of the fuel cell system is made to generate power in the fuel cell 1 to generate the power amount of C1 and LIB 3 is charged by way of the DC-DC converter 41, the control circuit 40, the power detecting circuit 42. When hydrogen remaining at inside of the fuel cell system has been used up and power cannot be outputted from the DC-DC converter 41, the control circuit 40 cuts the electric path of the DC-DC converter 41 and the power detecting circuit 42 to finish to operate the fuel cell system in a state of connecting the power detecting circuit 42 and the external load 5.

Embodiment 3

Figure 7:
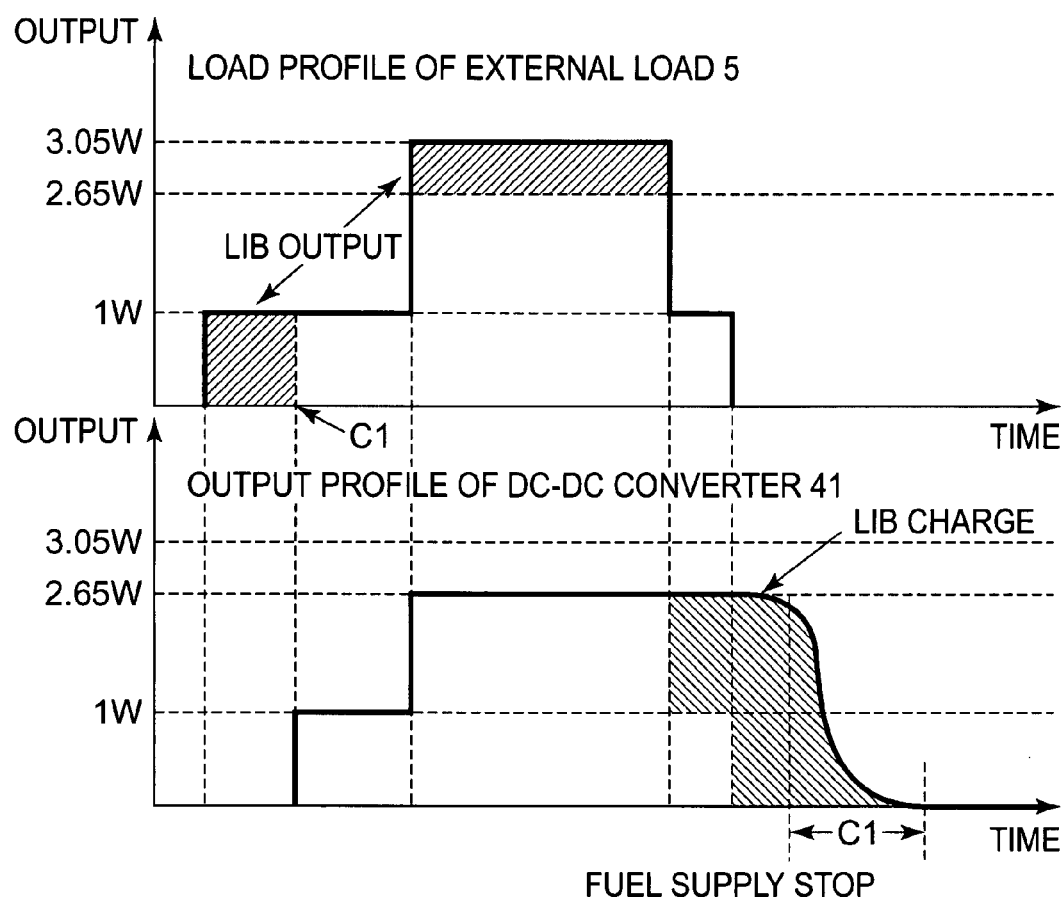
FIG. 7 is an outline diagram showing an example of a load profile of the external load 5 and an output profile of the DC-DC converter 41 at this occasion according to Embodiment 3 of the invention.

Embodiment 3 of the fuel cell system according to the invention will be explained as follows in reference to FIG. 7.

Power is supplied actually to the external load by using the fuel cell system constituted in Embodiment 1. FIG. 7 shows a load profile of the external load 5 and an output profile of the DC-DC converter 41 at this occasion.

In starting the fuel cell system, at the control circuit 40, the external load 5 and the power detecting circuit 42 are connected. When the external load 5 is applied, power is swiftly supplied from LIB 3 to the external load 5. The load applied here is set to 1 W. When the power detecting circuit 42 detects a power amount outputted from LIB 3 and it is determined that LIB 3 outputs 0.9 W·min or more (C1) to the external load based on the signal detected by the control circuit 40, the detecting means 40 brings the valve 21 into an open state and the fuel is supplied to the fuel cell 1. Here, the control circuit 40 opens the valve 21 at 0.9 minute after supplying the load.

In a state of supplying the fuel to the fuel cell 1, when a load of the external load 5 in a steady state is equal to or smaller than the maximum output of the DC-DC converter, power is not supplied from LIB 3 to the external load. Hence, a value of setting the load of the external load 5 of 3.05 W equal to or larger than the maximum output of the DC-DC converter is applied for 2 minutes. At this occasion, 2.65 W of the maximum output is outputted from the DC-DC converter and a deficient amount of 0.4 W is outputted from LIB 3. The amount of power outputted from LIB 3 is detected by the power detecting circuit 42 and the detected value is operated and stored by the control circuit 40.

Thereafter, when the load of the external load 5 is reduced to 1 W, the load of 1 W is equal to or smaller than 2.65 W of the maximum output of the DC-DC converter 41 and an output of charging LIB 3 can be outputted from the DC-DC converter. At this occasion, the control circuit 40 charges LIB 3 by the power amount (C2 of FIG. 6) outputted from LIB 3 when the external load is 3.05 W by using the power amount constituted by subtracting the output amount of the external load 5 from the maximum output of the DC-DC converter 41. When the load of 1 W of the external load 5 is stopped when the amount of charging LIB 3 is less than C2, the control circuit 40 continues generating power by the fuel cell 1 and continues charging LIB 3 without stopping to supply the fuel to the fuel cell 1. When the control circuit 40 determines that the amount of charging LIB 3 reaches C2, the control circuit 40 brings the valve 21 into a closed state to stop to supply the fuel to the fuel cell 1. Hydrogen capable of outputting the power amount of C1 remains at inside of the fuel cell system. After stopping to supply the fuel to the fuel cell 1, hydrogen remaining at inside of the fuel cell sytsem is made to generate power in the fuel cell 1 to generate the power amount of C1 and LIB 3 is charged by way of the DC-DC converter 41, the control circuit 40, and the power detecting circuit 42. When hydrogen remaining at inside of the fuel cell system has been used up and power cannot be outputted from the DC-DC converter 41, the control circuit 40 cuts the electric path of the DC-DC converter 41 and the power detecting circuit 42 to finish operating the fuel cell system in a state of connecting the power detecting circuit 42 and the external load 5.

Embodiment 4

Embodiment 4 of a fuel cell system according to the invention will be explained as follows.

By using the fuel cell system shown in Embodiment 1 and constituting the power C1 provided from the fuel cell by consuming the fuel remaining at inside of the fuel cell system to 0.9 W·min similarly, based on C1, switching of the electric path and control of the valve 21 are carried out by the control circuit 40.

An explanation will be given of a method of operating the fuel cell system by actually connecting the output end of the fuel cell system to the external load 5 as follows in reference to FIG. 8 as follows.

Figure 8:
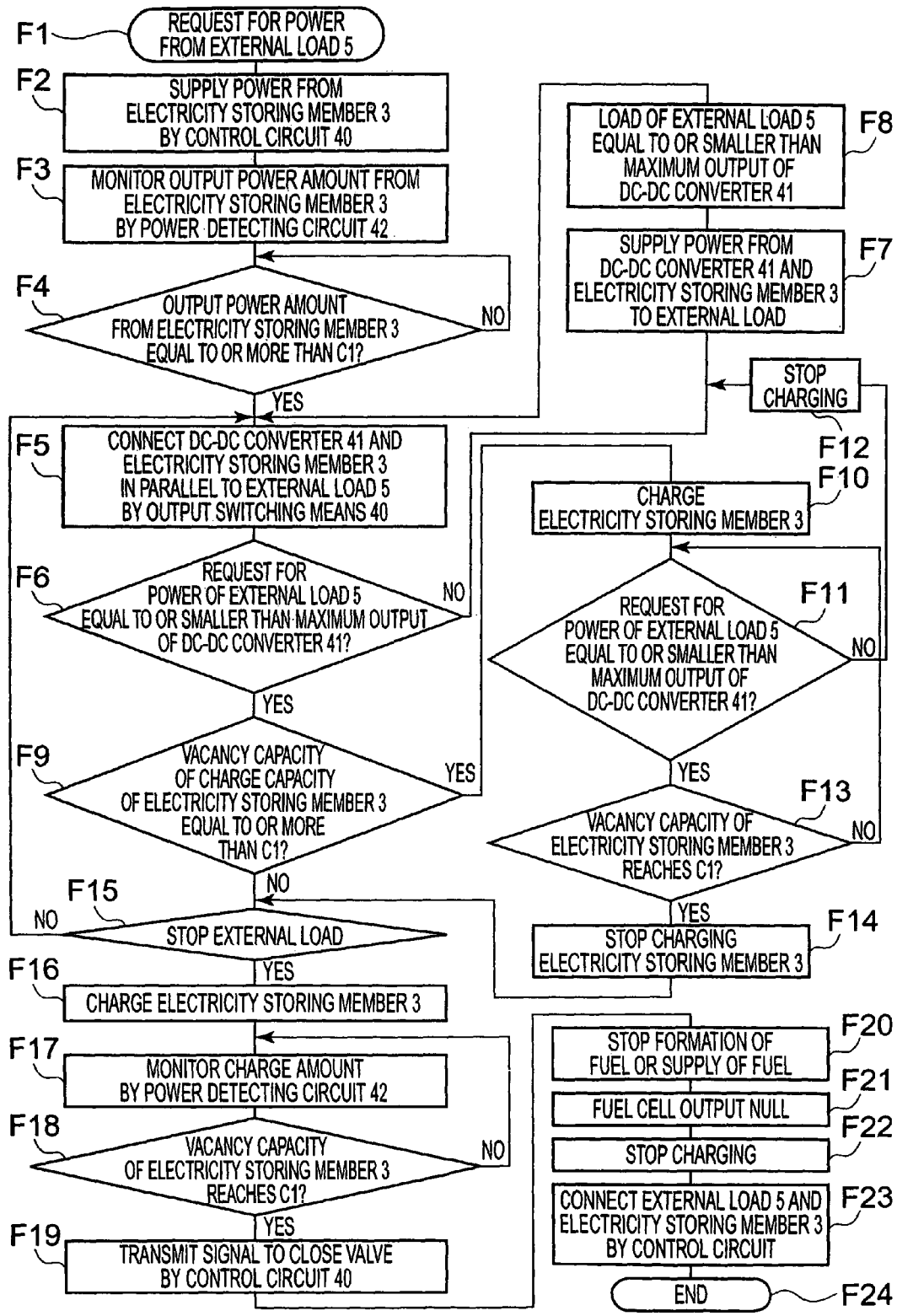
FIG. 8 is a flowchart showing a method of operating a fuel cell system according to Embodiment 4 of the invention.

As shown by F1 of FIG. 8, when there is a request for power from the external load 5 to the fuel cell system, as shown by F2, the fuel cell system supplies power thereto from LIB 3 constituting the electricity storing member 3 by the control unit 4. At this occasion, the power detecting circuit 42 monitors an output power amount from LIB 3 by detecting a current to LIB 3 (F3).

Until outputting the power amount C1 or more provided from the fuel cell by consuming the fuel remaining at inside of the fuel cell system, in this case, until LIB 3 outputs power by 0.9 W·min or more, LIB 3 supplies power to the external load 5 (F4).

When the control circuit 40 determines that LIB 3 outputs power by C1 or more based on the signal from the power detecting circuit 42, supply of power to the external load 5 is switched to output of the fuel cell 1 by way of the DC-DC converter 41 (F5). Here, when the request for power of the external load 5 exceeds the maximum power from the fuel cell 1 provided by way of the DC-DC converter (F6), that is, when the output of the DC-DC converter 41 is equal to or larger than 2.65 W, the power is supplied to the external load by connecting the output end of the DC-DC converter 41 and the output end of LIB 3 in parallel by the control circuit 40 (F7). Thereafter, when the load power of the external load 5 becomes equal to or smaller than the maximum output of the DC-DC converter 41 (F8), the operation returns to the processing F5 of the flowchart.

The control circuit 40 forms the electric path for charging LIB 3 (F10) when LIB 3 outputs power equal to or larger than C1 in supplying power to the external load 5.

When the request for power of the external load 5 exceeds the maximum output of the DC-DC converter 41, charging is stopped (F12), and the operation shifts to the processing F7 of the flowchart.

When the request for power of the external load 5 does not exceed the maximum output of the DC-DC converter 41 and the vacant capacity of the LIB 3 for charging reaches C1 (F13), charging is stopped (F14). The processings from F6 of the flowchart are carried out until stopping the external load 5.

When the external load 5 is stopped (F15), LIB 3 is charged without stopping power generation of the fuel cell 1 (F16). The power detecting circuit 42 monitors an amount of charging LIB 3 (F17). In charging LIB 3, LIB 3 is charged without stopping the fuel suppleer until the vacant capacity of the LIB 3 for charging reaches C1. When the vacant capacity of the LIB 3 for charging reaches C1 (F18), the control circuit 40 transmits a signal to the fuel supplier 2 to close the valve 21 of the fuel supplier 2 (F19), and a supply of the fuel source is stopped (F20).

The fuel cell 1 generates power by consuming hydrogen which is the fuel remaining at inside of the fuel cell system to charge LIB 3. When the output is not provided from the fuel cell 1 by consuming hydrogen which is the fuel remaining at inside of the fuel cell system (F21), the fuel cell 1 stops charging LIB 3 (F22). After finishing to charge LIB 3, the control circuit 40 finishes to operate the fuel cell system (F24) in a state of cutting the electric path of the DC-DC converter 41 and the power detecting circuit 42 and connecting the electricity storing member 3 and the external load 5 by way of the power detecting circuit 42 (F23). Therefore, hydrogen which is the fuel remaining at inside of the fuel cell system can firmly be consumed.

Embodiment 5

Figure 3:
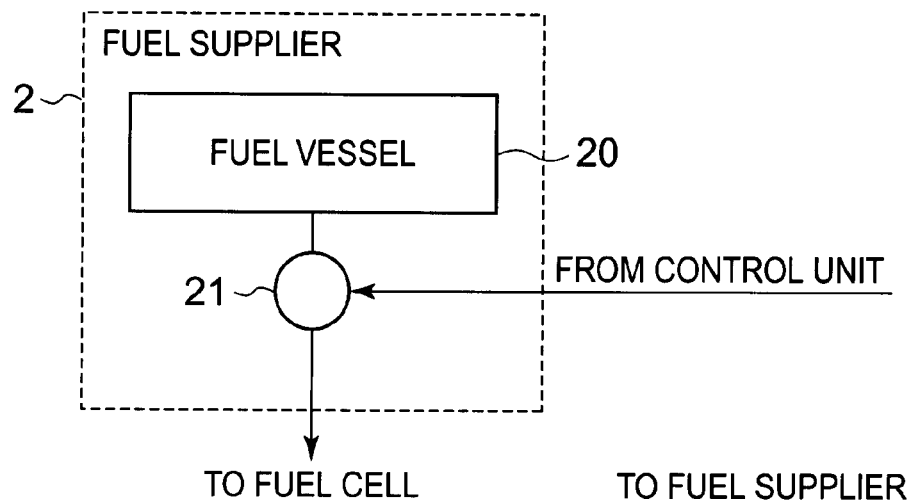
FIG. 3 is an outline diagram showing an example of a constitution of the fuel supplier 2 according to Embodiment 5 of the invention.
Figure 9:
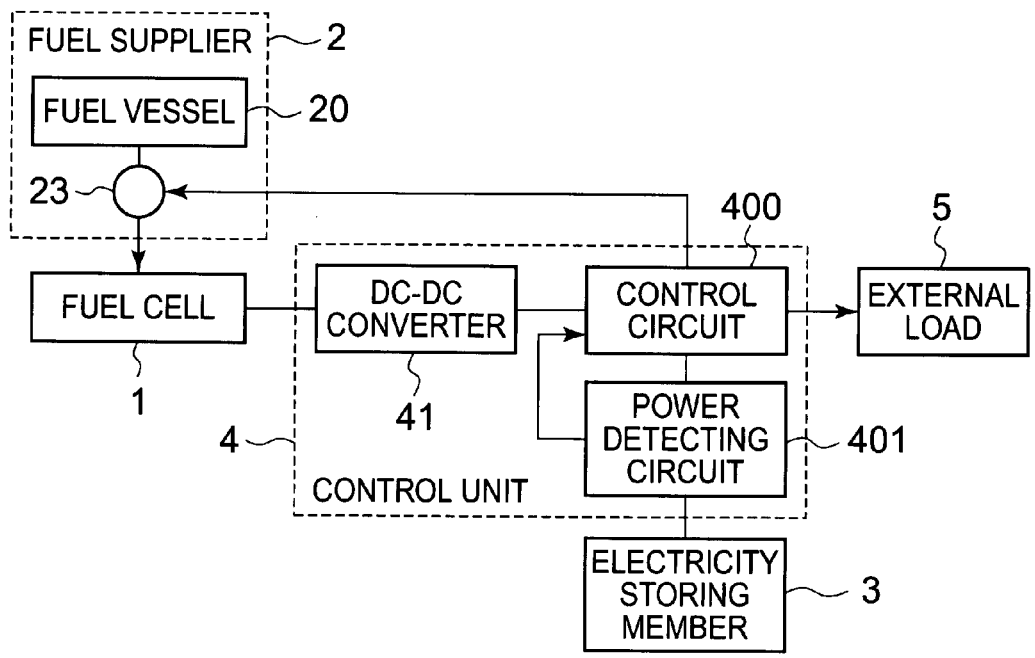
FIG. 9 is an outline diagram showing an example of a constitution of a fuel cell system according to Embodiment 5 of the invention.

Embodiment 5 of a fuel cell system according to the invention will be explained as follows in reference to FIG. 9. In the constitution shown in Embodiment 1, power generation is carried out by using an aqueous solution of 20 wt % of methanol and constituting the fuel cell 1 by a direct methanol type fuel cell (DMFC). As the fuel cell 1, 6 of single cells of fuel cells are prepared to be connected in series. In constituting the fuel supplier 2, as shown by FIG. 3, the fuel cell supplier 2 is constituted by a fuel vessel 20 and a pump 23 and the total constitution of the fuel cell system is as shown by FIG. 9.

The power capacity C1 provided from the fuel cell 1 by way of the DC-DC converter 41 by stopping to operate the pump 23 and consuming the fuel remaining at inside of the fuel cell system from a state of supplying the fuel to the fuel cell 1 by the fuel supplier 2 and consuming the fuel remaining at inside of the fuel cell system has been about 0.3 W·min.

Similar to Embodiment 1, the control circuit 40 is constituted by the operating circuit for adding and subtracting the output of the amplifier of the power detecting circuit 42 inputted to the signal input terminal 401, although not illustrated, and the comparing operating circuit for comparing a result of operation of the operating circuit and the previously set threshold, switching the electric path of the DC-DC converter 41 and the power detecting circuit 42 and the external load 5 and generating the signal for controlling to open and close the valve 23, and the previously set threshold is set based on 0.3 W·min constituting the power amount C1. A program using PC on sale is formed for steps of operating the fuel cell system, downloaded to a microcomputer and is mounted to the control circuit 40.

Embodiment 6

Figure 10:
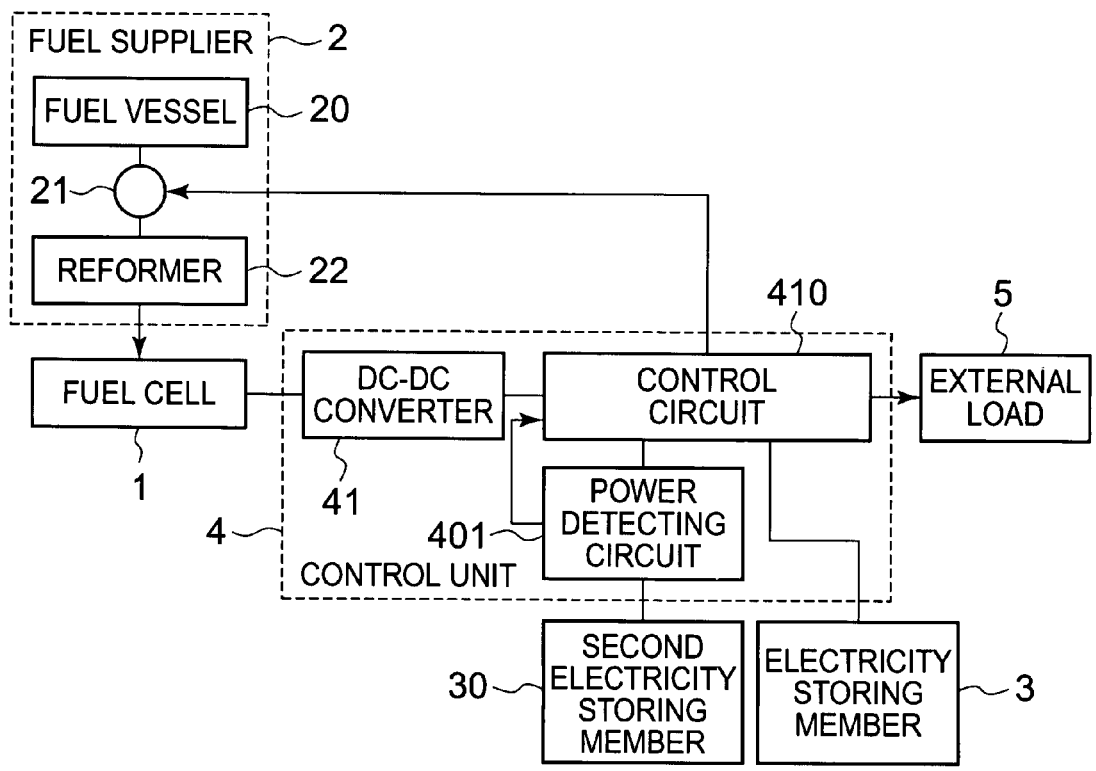
FIG. 10 is an outline diagram showing an example of a constitution of a fuel cell system according to Embodiment 6 of the invention.

Embodiment 6 of a fuel cell system according to the invention will be explained as follows in reference to FIG. 10.

Based on the constitution shown in Embodiment 1, a second electricity storing member 30 is added to the fuel cell system other than the electricity storing member 3.

The second electricity storing member 30 charges the power amount C1 provided from the DC-DC converter 41 by generating power by the fuel cell 1 by hydrogen remaining at inside of the fuel cell system after cutting supply of the fuel from the fuel supplier 2 to the fuel cell 1 and discharges power in starting the fuel cell system at successive time.

At the second electricity storing member 30, it is necessary to prepare a charging battery capable of ensuring a charge capacity equal to or larger than at least C1 (0.9 W·min). In the case of a lithium ion secondary cell (LIB) having a charge voltage of 4.2 V, LIB having a capacity equal to or larger than 214 mAh is needed, in this case, LIB of 300 mAh is prepared. As the electricity storing member 3, similar to Embodiment 1, LIB 3 having a charge voltage of 4.2 V and a rated capacity of 700 mAh is used.

The power detecting circuit 401 detects a voltage value of the second electricity storing member 30 and outputs a detected value thereof to the control circuit 410. The control circuit 410 controls to switch the electric path and open and close the valve 21 based on a signal inputted from the power detecting circuit 401.

In starting the fuel cell system, the external load 5 and the second electricity storing member 30 are connected by way of the power detecting circuit 401 by the control circuit 410. When power is requested from the external load 5, power is supplied swiftly from the electricity storing member 30 to the external load 5. When the input signal from the power detecting circuit 401 to the control circuit 410 becomes equal to or smaller than a discharge lower limit voltage value of the electricity storing member 30, the control circuit 410 releases the external load 5 and the power detecting circuit 401 from being connected to each other and starts to supply the fuel to the fuel cell 1 by opening the valve 21. Simultaneously therewith, the control circuit 410 connects the DC-DC converter 41 and the electricity storing member 3 to the external load 5 in parallel.

In a state of opening the valve 21 and in a state of supplying the fuel to the fuel cell 1, in a range equal to or smaller than the maximum output of the DC-DC converter 41, the electricity storing member 3 is charged to be fully charged.

When the electricity storing member 3 is not fully charged after stopping the external load 5, the fuel is continued to supply to the fuel cell 1 until the electricity storing member 3 is fully charged.

When the external load 5 is stopped and the electricity storing member 3 is brought into a fully charged state, the control circuit 410 releases the electricity storing member 3 from being connected, closes the valve 21, stops supplying the fuel to the fuel cell 1 and connects the DC-DC converter 41 and the power detecting circuit 401. The second electricity storing member 30 is charged by way of the DC-DC converter 41, the control circuit 410, and the power detecting circuit 401 by generating the power amount of C1 by generating power in the fuel cell 1 by hydrogen remaining at inside of the fuel cell system. When hydrogen remaining at inside of the fuel cell system has been used up and power cannot be outputted from the DC-DC converter 41, the control circuit 410 cuts the electric path of the DC-DC converter 41 and the power detecting circuit 401 and finishes operating the fuel cell system in a state of connecting the power detecting circuit 42 and the external load 5.

Embodiment 7

The embodiment is particularly for preventing polarity reversion or the like by power generation in an overloaded state of a fuel cell by a deficiency in a fuel relative to a load after stopping to supply the fuel to the fuel cell, and only a single cell as the fuel cell 1 is used. That is, according to the seventh embodiment, only the constitution of the fuel cell 1 differs from that of the first embodiment and other constitution is constructed by a similar constitution. Hence, drawings and duplicated explanation will be omitted.

The maximum output of the fuel cell 1 has been 1.62 W and the maximum output of the DC-DC converter 41 has been 1.16 W. Further, the power amount C1 provided from the DC-DC converter 41 by generating power at the fuel cell 1 by hydrogen remaining at inside of the fuel cell system after cutting to supply the fuel from the fuel supplier 2 to the fuel cell 1 has been 0.45 W·min. The control circuit is mounted with a microcomputer stored with the program based on the flowchart shown in FIG. 8.

The load of the external load 5 is set to 1.5 W and the power is outputted from the fuel cell system. About 0.3 second after outputting the power from the fuel cell system, the fuel is supplied from the fuel supplier 2 to the fuel cell 1. When the external load 5 is stopped 2 minutes after starting to output the power from the fuel cell system, the fuel is continued to supply to the fuel cell 1 and when a power amount of about 0.68 W·min is charged to LIB 3, the control unit closes the valve 21. The fuel cell continues generating power even thereafter, and the fuel cell system is finished to be operated by charging a power amount of about 0.45 W·min to LIB 3. During the time period, a polarity reversion state by a deficiency in the fuel or the like is not observed in the fuel cell 1 and a mode of deteriorating the fuel cell 1 can be avoided.

Further, when a fuel cell is constituted by a plurality of cells, in order to prevent polarity reversion or the like by power generation in an overloaded state of the fuel cell by a deficiency in a fuel relative to a load after stopping to supply the fuel to the fuel cell, there may be constructed a constitution of supplying power to the electricity storing member by outputting an output from one cell of the fuel cell constituted by the plurality of cells simultaneously with cutting to supply the fuel to the fuel cell.

Further, with regard to an electricity storing member or a second electricity storing member, as an electricity storing member, the electricity storing member is not limited to a secondary cell, a capacitor, a condenser but may be made to be able to store electric energy, the electric energy may be converted into mechanical energy to store the energy in a mainspring or the like.

Further, the invention is not limited to the embodiments but can be changed in an embodiment stage so far as the gist is not deviated. Further, the embodiments include the invention at respective stages. Constitutions by pertinent combinations of a plurality of constituents disclosed can be extracted as the invention.

INDUSTRIAL APPLICABILITY

The fuel cell system of the invention can be applied as power sources of electronic apparatus since safety is high, a rate of utilizing a fuel is high and therefore, an energy density is high, and stable power can be supplied.

The invention claimed is:

1. A method of operating a fuel cell system which has a multi-cell fuel cell having a plurality of single cells connected to a fuel supplier, an electricity storing member, and a control unit connected to the fuel cell and the electricity storing member, the method comprising:
   a step of starting to supply power from the electricity storing member to the control unit and an external load connected to the, control unit when starting the fuel cell system;
   a step of detecting a power discharge amount of the electricity storing member;
   a step of starting to supply a fuel from the fuel supplier to the fuel cell when the power discharge amount of the electricity storing member reaches a predetermined power discharging amount that is equal to or greater than the amount of power provided from the fuel cell by consuming the fuel remaining inside the fuel cell after stopping to supply the fuel from the fuel supplier to the fuel cell;
   a step of supplying the power from the fuel cell to the external load by way of the control unit;
   a step of detecting the power discharge amount of the electricity storing member by restarting the supply of power from the electricity storing member to the external load by way of the control unit when a request for power from the load is equal to or larger than a maximum output of the fuel cell;
   a step of supplying the power from the fuel cell to the external load by way of the control unit and charging an electricity amount of an amount of a difference between a predetermined value and the power discharge amount to the electricity storing member when the request for the power from the load is less than the maximum power of the fuel cell and the power discharge amount of the electricity storing member is equal to or larger than the predetermined value;

a step of starting to supply the power from the fuel cell to the control unit and interrupting. the supply of power from the electricity storing member to the control unit;
a step of stopping to supply the fuel to the fuel cell when the external load is stopped;
a step of continuing to generate power by the fuel remaining inside of the fuel cell using only a single cell of the multi-cell fuel cell simultaneously with stopping the supply of the fuel to the fuel cell; and
a step of supplying the power generated by the remaining fuel to the electricity storing member by way of the control unit.

2. A method of operating a fuel cell system which has a multi-cell fuel cell having a plurality of single cells connected to a fuel supplier, an electricity storing member, and a control unit connected to the fuel cell and the electricity storing member, the method comprising:
a step of starting to supply power from the electricity storing member to the control unit and an external load connected to the control unit when starting the fuel cell system;
a step of detecting a power discharge amount of the electricity storing member;
a step of starting to supply a fuel from the fuel supplier to the fuel cell when the power discharge amount of the electricity storing member reaches a predetermined power discharging amount that is equal to or greater than the amount of power provided from the fuel cell by consuming the fuel remaining inside the fuel cell after stopping to supply the fuel from the fuel supplier to the fuel cell;
a step of supplying the power from the fuel cell to the external load by way of the control unit;
a step of detecting the power discharge amount of the electricity storing member by restarting the supply of power from the electricity storing member to the external load by way of the control unit when a request for power from the load is equal to or larger than a maximum output of the fuel cell;
a step of supplying the power from the fuel cell to the external load by way of the control unit and charging an electricity amount of an amount of a difference between a predetermined value and the power discharge amount to the electricity storing member when the request for the power from the load is less than the maximum power of the fuel cell and the power discharge amount of the electricity storing member is equal to or larger than the predetermined value;
a step of starting to supply the power from the fuel cell to the control unit and interrupting the supply of power from the electricity storing member to the control unit;
and when the external load is stopped and the power discharge amount of the electricity storing member is equal to or larger than the predetermined value:
a step of generating the electricity amount of the amount of the difference between the predetermined value and the power discharge amount by the fuel cell and supplying the power to the electricity storing member by way of the control unit;
a step of stopping to supply the fuel to the fuel cell;
a step of continuing to generate power by the fuel remaining inside of the fuel cell using only a single cell of the multi-cell fuel cell simultaneously with stopping the supply of the fuel to the fuel cell; and
a step of supplying the power generated by the remaining fuel to the electricity storing member by way of the control unit.

3. A fuel cell system comprising:
a fuel cell;
a fuel supplier including a fuel vessel for holding a fuel or a reaction assisting catalyst, and a valve connected to the fuel vessel for supplying the fuel to the fuel cell;
first and second electricity storing members for storing and discharging electricity; and
a control unit including a DC-DC converter connected to the fuel cell for controlling an output of the fuel cell, a power detecting circuit connected to the second electricity storing member for detecting an amount of charging and discharging of the second electricity storing member, and a control circuit connected to the DC-DC converter, the power detecting circuit and the first electricity storing member for forming an electric path that connects the DC-DC converter, the power detecting circuit, the first electricity storing member and an external load, for opening and closing the valve to control the supplying of the fuel to the fuel cell based on a detection value of the amount of charging and discharging of the second electricity storing member detected by the power detecting circuit, and for charging the second electricity storing member by ensuring that it has a vacant capacity equal to or larger than the amount of power provided from the fuel cell by consuming the fuel remaining inside the fuel cell after stopping to supply the fuel from the fuel supplier to the fuel cell.

4. A fuel cell system according to claim 3; wherein the fuel supplier comprises a fuel vessel for holding the fuel or a reaction assisting catalyst, and a pump connected to the fuel vessel for supplying and cutting the fuel to the fuel cell.

5. A fuel cell system according to claim 3; wherein the fuel supplier comprises a fuel vessel for holding a fuel source or a reaction assisting catalyst, a reformer connected to the fuel cell for forming the fuel of the fuel cell from the fuel source, and a valve connected to the fuel vessel and the reformer for supplying and cutting the fuel source from the fuel vessel to the reformer.

6. A fuel cell system according to claim 3; wherein the fuel supplier comprises a fuel vessel for holding a fuel source, a reformer connected to the fuel cell for forming the fuel of the fuel cell based on the fuel source, and a pump connected to the fuel vessel and the reformer for supplying and cutting the fuel source from the fuel vessel to the reformer.

7. A method of operating a fuel cell system having a fuel supplier that supplies fuel to a multi-cell fuel cell having a plurality of single cells to produce electricity, an electricity storing member that stores electricity, and a control unit that controls the supplying of electricity to an external load connected to the control unit, the method comprising the steps:
supplying electricity from the electricity storing member to the external load by way of the control unit in starting the fuel cell system;
detecting the amount of electricity discharged from the electricity storing member;
starting to supply fuel from the fuel supplier to the fuel cell to produce electricity when the detected amount of electricity discharged from the electricity storing member is equal to or larger than a predetermined value which corresponds to the amount of electricity that would be produced by the fuel cell by consuming the fuel that remains inside the fuel cell after stopping to supply fuel from the fuel supplier to the fuel cell;
starting to supply electricity produced by the fuel cell to the external load by way of the control unit and stopping to supply electricity from the electricity storing member to the control unit;

stopping to supply fuel from the fuel supplier to the fuel cell when the external load is stopped;

continuing to produce electricity by the fuel cell using the fuel remaining inside the fuel cell using only a single cell of the multi-cell fuel cell simultaneously with stopping the supply of the fuel to the fuel cell; and supplying the electricity produced by consuming the remaining fuel to the electricity storing member by way of the control unit.

8. A method according to claim 7; further including the step:

determining, prior to the step of starting to supply fuel from the fuel supplier to the fuel cell, the predetermined value.

9. A method according to claim 8; wherein the predetermined value is fixed and does not vary during operation of the fuel cell system.

* * * * *